United States Patent [19]

Kirby

[11] Patent Number: 5,142,531
[45] Date of Patent: Aug. 25, 1992

[54] DATA COMMUNICATIONS NETWORK

[75] Inventor: Lewis G. Kirby, Ipswich, England

[73] Assignee: British Telecommunications public limited company, Great Britain

[21] Appl. No.: 522,601

[22] Filed: May 10, 1990

[30] Foreign Application Priority Data

May 18, 1989 [GB] United Kingdom ................ 8911395

[51] Int. Cl.$^5$ ............................................... H04J 3/24
[52] U.S. Cl. .................................... 370/94.3; 370/94.1
[58] Field of Search ..................... 370/58.1, 58.2, 58.3, 370/60, 60.1, 94.1, 94.2, 94.3, 85.13, 85.14

[56] References Cited

U.S. PATENT DOCUMENTS

| | | | |
|---|---|---|---|
| 4,644,532 | 2/1987 | George et al. | 370/94.3 |
| 4,736,363 | 4/1988 | Aubin et al. | |
| 4,866,668 | 9/1989 | Edmonds et al. | 370/94.3 |
| 4,965,791 | 10/1989 | Hutchison et al. | 370/94.3 |
| 4,999,833 | 3/1991 | Lee | 370/94.3 |
| 5,008,882 | 4/1991 | Peterson et al. | 370/94.3 |

OTHER PUBLICATIONS

1987 IEE Military communications Conference Milcom'87, Washington 19th–22nd Oct. 1987, vol. 2, pp. 587–584, IEEE, New York, US; J. B. Cain et al: "A Near-Optimum Multiple Path Routing Algorithm for Space-Based SDI Networks".

Third International Network Planning Symposium, Tarpon Springs, Fla., 1st–6th Jun. 1986, pp. 94–97, IEEE, New York, US; K. E. Nussler et al.: "Routing Techniques and Their Impact on the Capacity Planning Procedure in Datex-P".

Computer, vol. 17, No. 6, Jun. 1984, pp. 46–56, IEEE, Long Beach, Calif. US; W. N. Hsieh et al: "Routing Strategies in Computer Networks".

Primary Examiner—Douglas W. Olms
Assistant Examiner—Wellington Chin
Attorney, Agent, or Firm—Nixon & Vanderhye

[57] ABSTRACT

A network is arranged to generate circuits between source node ($N_S$) and destination nodes ($N_D$) by means of datagrams which are guided at each node over a path (D) which minimizes delay in establishing the circuit. Certain sub-destination nodes ($N_B$ and $N_C$) are designated as intermediate circuit nodes by the datagram and accordingly a circuit (C) is established. Each circuit node is determined by the preceding circuit node in such a manner as to minimize the hop count to the destination node ($N_D$). To this end, each node incorporates in its memory (M) a first list (LIST 1) showing the link with the best hop count to each possible destination node and also incorporates a list (LIST 2) of its links with the best transmission delay to the destination node. These lists are updated dynamically by means of routing information packets which are exchanged between neighboring nodes. However, best hop count and best delay information is not transmitted over those links (L) which are themselves the subject of that information. In this manner "ping-pong" type looping is avoided.

27 Claims, 6 Drawing Sheets

DATA COMMUNICATIONS NETWORK

BACKGROUND OF THE INVENTION

1. Field of the Invention

The present invention relates to a distributed communications network, that is to say a communications network in which the control of data transmission is not localised but is distributed between a plurality of nodes in the network.

2. Description of Related Art

Hitherto, most networks have been arranged to provide either a connection-oriented service or a connectionless service. In a connection-oriented service, a circuit is established between a source node and a destination node of the network, and all the data transferred between the source node and destination node travels via the links and nodes incorporated in the circuit. The circuit is released only when the call is terminated. Such an arrangement has the advantage that all the data arrives at the destination node in the same order as it is transmitted from the source node. In a connectionless service, data is transmitted between a source node and a destination node via packets (generally referred to as datagrams) which each include the address of the destination node and travel along one or more paths through the network to the destination node, the paths chosen generally depending upon the conditions in the network. Accordingly the datagrams for the source node can reach the destination node via a multiplicity of paths through the network, each having different delays so that the order in which the datagrams are received at the destination node does not necessarily correspond to the order in which the datagrams are transmitted from the source node. Accordingly, facilities are normally required to re-order the data received by a destination node of such a network.

For a general discussion of computer networks, reference is made to Tanenbaum "Computer Networks" 2nd Edn. (1989) Prentice-Hall Inc., particularly the OSI reference model shown in FIGS. 1-7 (p. 15). In this model the network is conceptually divided into seven layers. The following description relates mainly to layer 3, the network layer.

Some of the more important networks are summarised below: TYMNET is a commercial value-added network operated by ST Tymnet Inc of California. It was set up in 1971 and currently has approximately 1000 nodes in the USA and Europe. Routes in TYMNET are computed by a central Supervisor node, which has its own representation of the complete network. A route computation is carried out every time a circuit is needed. A path is set up using a NEEDLE packet, which knows its route when it is generated by the Supervisor. This packet travels to the source of the call and then travels to the destination node, setting up a circuit as it goes. The circuit is dismantled using a ZAPPER packet.

Packets are forwarded over the constructed circuit by using logical channel associations set up by the NEEDLE packet. In TYMNET, link costs are assigned by the Supervisor according to the link capacity, transmission facilities, the type of sessions, and so on. To help with this, each node periodically sends status reports to the Supervisor. In TYMNET the link cost function is based partially on the link load; when the load changes sufficiently the Supervisor is informed. On failure all nodes incident to the failure inform the Supervisor, all circuits using failed links are dismantled, and the Supervisor then generates fresh circuits and creates them using NEEDLEs.

Thus TYMNET is a centralised communications network which is connection-oriented. In particular, it should be noted that both the NEEDLE and the ZAPPER packets travel in predetermined circuits and are therefore not classified as datagrams.

ARPANET (Advanced Research Projects Agency Network) was the first network in the USA to use packet-switching technology. It was set up as an experimental network to investigate system resource sharing in 1969, and currently connects approximately 60 nodes in the USA and Europe. Routes are generated in ARPANET in a distributed fashion. Each node maintains a network database, which includes a complete network topology and the link costs. Each node broadcasts the link costs of its incident links to all other nodes periodically. ARPANET uses datagrams, so that circuits do not have to be constructed. Each node calculates a Routeing Table (RT) from its delay table and topology database; this RT contains the best outgoing link to all nodes in the network. Packet routeing in ARPANET is datagram-oriented. An end-to-end protocol is used to ensure that packets are received at the destination in the correct order.

The link cost is the average packet delay suffered by a packet over the link during a 10-second interval. Thus packet delay includes queueing and processing. In ARPANET the link cost function is based partially on the link load, when the load changes sufficiently all other nodes in the network are informed. Also, since the routeing decision is made at the nodes without concern for the session, packets tend to be steered towards areas of low congestion. Network component failure triggers a link cost update and hence a route generation update; this is essentially no different from other link cost changes apart from the topology changing. When a link fails, all packets queued for that link are discarded.

Thus ARPANET is a connectionless distributed data communications network.

DECnet is any network which uses the Digital Network Architecture developed by the Digital Equipment Corporation. In DECnet routes are computed in a distributed fashion. Whenever a link cost changes, the information ripples out through the network. The link costs are based on the full capacity of the link, and are assigned by the system manager. They are updated only when the transmission facilities change status, e.g. failure. Routeing in DECnet is datagram-oriented, so the transport layer orders the packets at the destination. Network component failure triggers a link cost update and hence a route generation update; this is essentially no different from other link costs changes apart from the topology changing. When a link fails, all packets queued for that link are discarded.

Thus the DECnet network is entirely connectionless (i.e. only datagrams are used) and in most respects is distributed, although the link costs are assigned by a central network manger node. MERIT is a small network, intended to connect the computers belonging to the universities and colleges in the state of Michigan, USA. In MERIT routes are generated in a distributed fashion. Whenever a link cost changes, information ripples out through the network. This information is in the form of NETCHANGE messages sent between neighbours; the receiving node then updates its tables and may itself send NETCHANGE messages. The link cost in MERIT is based on hop-count only.

Failure may cause the hop-count in a NETCHANGE message to be increased to the number of nodes in the network, in which case it is assumed that the appropriate node is unreachable. Routeing in MERIT is datagram-oriented.

Thus the MERIT network is a distributed, connectionless network. It will be noted that each of the above networks is either a centralised, purely connection-oriented network or is a distributed, connectionless (i.e. datagram-oriented) network.

SUMMARY OF THE INVENTION

An object of the present invention is to provide a distributed, connection-oriented network.

Accordingly, the invention provides a distributed communications network comprising a plurality of nodes which are each capable of acting as source, sub-destination and destination nodes, the nodes being interconnected by links and each node having local processing and memory means, each node including in its memory means a stored list of destination nodes in association with a first stored list and a second stored list of its links or neighbouring nodes, each destination node being associated with a respective link or neighbouring node in said first stored list and in said second stored list, the processing means being arranged to send a datagram between a source node and a destination node one or more successive sub-destination nodes in response to the source node calling a remote destination node, each sub-destination node being determined by the link or neighbouring node selected from said first stored list in the source node or in a preceding sub-destination node, the datagram being arranged to designate at least some of said sub-destination nodes circuit nodes and to store circuit data in the memory means of the circuit nodes, said circuit data establishing a temporary circuit for data transmission between the source and destination nodes via said circuit nodes, each node traversed by said datagram which is not the source node, the destination node or a circuit being determined by selecting that link or neighbouring node from said second stored list in the immediately preceding node which is associated with the next designated circuit node in the path of the datagram, the criteria on which said first and second stored lists in each node are based being distinct and being biased towards optimum transmission of said data in said temporary circuit and optimum establishment of said temporary circuit, respectively.

In use, when a given node acts as a source node and calls a remote destination node in the network, a datagram is generated in the source node and the list in the source node is searched until the entry for the called destination node is found. This entry may be one of the links radiating from the source node (or alternatively one of the neighbouring nodes of the source node since there is a one-to-one correspondence between the radiating links and neighbouring nodes). The datagram then knows which link to traverse, and when it reaches the node at the end of the link, it looks up the entry for the called destination node in that node's list and finds the next link to traverse. This procedure is continued until the destination is reached by the datagram. In a typical embodiment, the link/neighbouring node entries in each list are those entries which minimize the hop count between the source and destination modes.

Thus the information required to guide the datagram from the source node to the destination node is not located in a single node (at the beginning of its journey, the datagram does not know the path it will take) but is distributed throughout the nodes in the network. In a simple embodiment, each subdestination node traversed by the datagram is designated as a circuit node and accordingly the circuit established by the datagram between the source and destination node is simply the path travelled by the datagram through the network. However this is not preferred, since it is now envisaged that the optimum criteria for guiding datagrams through the network are different from the optimum criteria for selecting circuits. In a simple embodiment, the nodes could each incorporate a permanent list showing the best link or neighbouring node from the node in question to various destination nodes are selectable by the datagram. However in preferred embodiments which are described below, the lists are updated in response to changes in the network. It will be seen that the communications network of the present invention combines the advantage of a connection-oriented service (in which data is received in the same order in which it is transmitted) with the simplicity of a distributed arrangement, which does not require an expensive central control computer. In a preferred embodiment, each node includes in its memory means a second stored list of its links or neighbouring nodes, each destination node being associated with a respective link or neighbouring node in said second list, each node traversed by said datagram which is not the source node, the destination node or a circuit node being determined by selecting that link or neighbouring node from said second list in the immediately preceding node which is associated with the next designated circuit node in the path of the datagram, the criteria on which said first and second lists in each node are based being distinct and being biased towards optimum transmission of said data in said temporary circuit and optimum establishment of said temporary circuit, respectively.

One such preferred embodiment is shown schematically in FIG. 1. The network shown in FIG. 1 comprises eight nodes N which are linked by communications links L. Each link L may for example be an optic fibre, a twisted pair of electrical conductors or even a satellite link. The precise nature of the links is immaterial. Each node N incorporates a memory M, only one of which is shown for the sake of clarity, namely the memory of node $N_S$.

It will be seen that memory M incorporates a list of each possible destination node which can be reached from node $N_S$. In association with this list of nodes, there is provided a first list (LIST 1), each entry in this list being one of the two links extending from node $N_S$. Each list entry in LIST 1 is the link which minimises the hop count from node $N_S$ to that destination node which is entered at the corresponding position in the list of nodes. Furthermore, memory M incorporates a second list (LIST 2), each entry of which is one of the links L leading from node $N_S$. Each list entry of LIST 2 is that link which minimises the transmission time for data sent from node $N_S$ to the destination node at the corresponding entry in the list of nodes. It is assumed that node $N_S$ calls node $N_D$. Accordingly a datagram is generated (which will subsequently be referred to as a BUILD datagram) and the entry in LIST 1 adjacent node $N_D$ in the list of nodes is examined to find that link which will enable the BUILD datagram to construct a circuit to node $N_D$ having the minimum hop count. It will be noted that the minimum hop count between $N_S$ and $N_D$ is 3, representing a circuit via node $N_B$. This node is the next node in the circuit but before the datagram is actually sent over the link to $N_B$, LIST 2 is examined to check that the direct link to $N_B$ is the route with the shortest delay. It is in fact the only route to $N_B$, and so the datagram is transmitted from node $N_S$ to node $N_B$ via the link L which joins them.

Node $N_B$ then looks up its own first and second lists in its associated memory means (not shown) and finds from its own LIST 1 that the node which will minimize hop count in the circuit to node $N_D$ is node $N_C$. It then looks up its LISTS 2 (not shown) and finds that the quickest route for sending the datagram to node $N_C$ is not the direct link from node $N_B$ to node $N_C$ but the link to intermediate node $N_E$. Accordingly, the BUILD datagram is sent to node $N_E$ but this subdestination node is not designated as a circuit node. Since node $N_E$ is not designated as a circuit node, it does not need to examine its LIST 1 in its associated memory means (not shown) but merely consults its LIST 2 (not shown) and finds that the quickest route to node $N_C$ is via the direct link L to that node. Accordingly the BUILD datagram is transmitted from node $N_E$ to Node $N_C$. Node $N_C$ is designated by the datagram as a circuit node and accordingly looks up its LIST 1 to find the link L which will minimize the hop count of the circuit to node $N_D$. It finds that there is a direct link to node $N_D$ and it then looks up its LIST 2 to find the quickest route for sending the BUILD datagram to node $N_D$. As a result, node $N_F$ is selected and the BUILD datagram is sent to this node but does not designate it a circuit node. Node $N_F$ accordingly merely looks up its LIST 2 and finds that the link with the least delay to node $N_D$ is the direct link joining node $N_F$ to node $N_D$. Accordingly the datagram is forwarded to node $N_D$ and the latter is designated as the destination node.

It will be seen that the path D traversed by the datagram (and shown in chain dotted lines) is different from the circuit C (shown in dashed lines) from the source node $N_S$ to destination node $N_D$. However, the time taken for the datagram to travel over path D is less than the time it would have taken to travel over route C. In general, the circuit path C and datagram path D will be determined by the criteria used to generate LISTs 1 and 2 for each node. It is advantageous to employ a minimum hop count criterion for establishing the circuit because during data transmission, loading of the network is minimised and the data-processing capacity of the nodes in the network is utilised most efficiently. It should be noted that in practice, a given node may be common to two or more independent data circuits and accordingly, the node will be required to process the incoming data and guide it to the appropriate links. Such processing will inevitably result in some delay and accordingly in some cases the transmission delay in a circuit between a source node and a destination node will depend mainly on the number of nodes in the circuit, rather than the delay due to the links themselves. Even when this is not the case, the links L will have a finite data-carrying capacity and in general, the data-carrying capacity of the network as a whole will be utilised most efficiently if each circuit employs the minimum possible number of links, i.e. the hop count of each circuit is minimised.

In general, the transmission of data through the circuit established by the BUILD datagram will be optimised by minimising the loading of the network, i.e. by minimising the hop count of the circuit.

The datagrams will not overload the network because the time taken for a datagram to establish a circuit will be much less than the duration of data transmission through the circuit. Instead, the optimum path for a datagram will be that path which minimises the delay in establishing the circuit.

Accordingly, in preferred embodiments the BUILD datagram is guided at each node to that outgoing link which will result in minimum delay to the next circuit node. This delay may for example be calculated and stored to ROM, but in preferred embodiments each node is arranged to measure periodically the delay to each of its neighbouring nodes by transmitting a timing packet to them and waiting for its neighbouring node to return the timing packet. This is illustrated in FIG. 1 where node $N_A$ is shown transmitting a timing packet to node $N_E$ which returns it as soon as it has identified it as a timing packet. Assuming that the total delay (including the processing time at node $N_E$) is 2d, then the delay recorded by node $N_A$ for the link to node $N_E$ is d. It will be noted that in general, the transmission delay between adjacent nodes will vary in dependence upon the conditions in the network, since the time taken for the processor at any given node to process any incoming message such as a timing packet will depend upon the loading of that processor by other incoming data.

As will subsequently be described, in preferred embodiments the nodes of network are arranged to transmit both delay and hop count information to distant nodes in the network. Changes in hop count between nodes may arise as a result of changes in the topology of the network as a result of addition of nodes or the failure of links, for example.

In a preferred embodiment, each node is arranged to update its first list in response to hop count information received from a neighbouring node which relates to the hop count between that neighbouring node and a distant node in the network, each node being arranged to increment the hop count in response to receiving such hop count information from a neighbouring node and to communicate the incremented hop count to its other neighbouring node (if any). Preferably, each node is arranged to update its second list in response to delay information received from a neighbouring node which relates to the transmission delay between that neighbouring node and a remote node in the network, each node being arranged to add to said transmission delay, the additional delay associated with receiving the delay information over the link from the neighbouring node, to transmit the resulting total delay information to its other neighbouring nodes (if any), and to measure said additional delay by transmitting and receiving a timing packet over the link via which the delay information was received.

In the above embodiments in which the first and second lists maintained by each node are updated by delay, hop count or other information which is relayed from distant nodes, a problem known as "ping-pong looping" can occur. This problem arises as a result of inconsistent information held in the lists of respective neighbouring nodes and involves the indefinite exchange of datagrams between adjacent nodes. For example, if in the network of FIG. 1 the node $N_E$ considers that the quickest route for transmitting a BUILD datagram to the next circuit node $N_C$ is via link L to node $N_B$, then the node $N_E$ will return the BUILD datagram to node $N_B$ which in turn will retransmit the BUILD datagram to node $N_E$. In principle, such "ping-ponging" could occur indefinitely and prevent establishment of the data circuit. Inconsistencies in the information available to neighbouring nodes can arise for various reasons, e.g. due to link failure which affects the updating of the information in the lists of certain nodes but not others.

This problem has been analysed by Shin and Chen in IEEE Transactions on Computers Volume C 36 No. 2 February 1987 pp. 129-137 "Performance Analysis of Distributed Routing strategies free of ping-pong type looping". In this paper Shin and Chen consider the ARPANET network which is a connectionless network. Shin and Chen propose the following solution to the problem of "ping-ponging" in the ARPANET network:

"If the routing message is passed for $N_j$ to $N_i$ which is the second node in the optimal path from $N_j$ to some destination node $N_d$ we replace the delay of the optimal path from $N_j$ to $N_d$ with the delay of its *second optimal path* (i.e. the path requiring the second shortest delay to $N_d$ among all paths in the network delay table of $N_j$) in the routing message passed to $N_i$."

It has now been found that in preferred embodiments of the present invention in which each node is arranged to communicate changes in its said first and/or second lists to selective neighbouring nodes in dependence upon the updated entries in its said first and/or second lists, the problem of "ping-ponging" can be avoided by ensuring that each amended link/neighbouring node entry is communicated only via those links to neighbouring nodes which do not correspond to that entry. For example, if in the embodiment of FIG. 1 node $N_B$ was informed that its link L to node $N_C$ would minimize the hop count in a circuit to $N_D$ (so that this link should be substituted in its LIST 1 (not shown) adjacent "$N_D$" in the list of nodes), then the information that LIST 1 of node $N_B$ had been updated would be communicated to node $N_C$ not via the direct link to that node but by an indirect route. This is a particularly significant feature of a preferred embodiment of the invention but is not strictly essential to any embodiment, since the problem of "ping-pong-type looping" can be alleviated in other ways. For example, a time limit may be set for the establishment of a circuit, and the source node may be arranged to attempt to establish an alternative circuit if an initial attempt fails as a result of ping-pong type looping or for some other reason.

Further preferred features of the invention are defined in the dependent claims.

Brief Description of the Drawings

Preferred embodiments of the invention are described below by way of example only with reference to FIGS. 1 to 4 of the accompanying drawings of which.

Description of Preferred Embodiments

Figure 1:
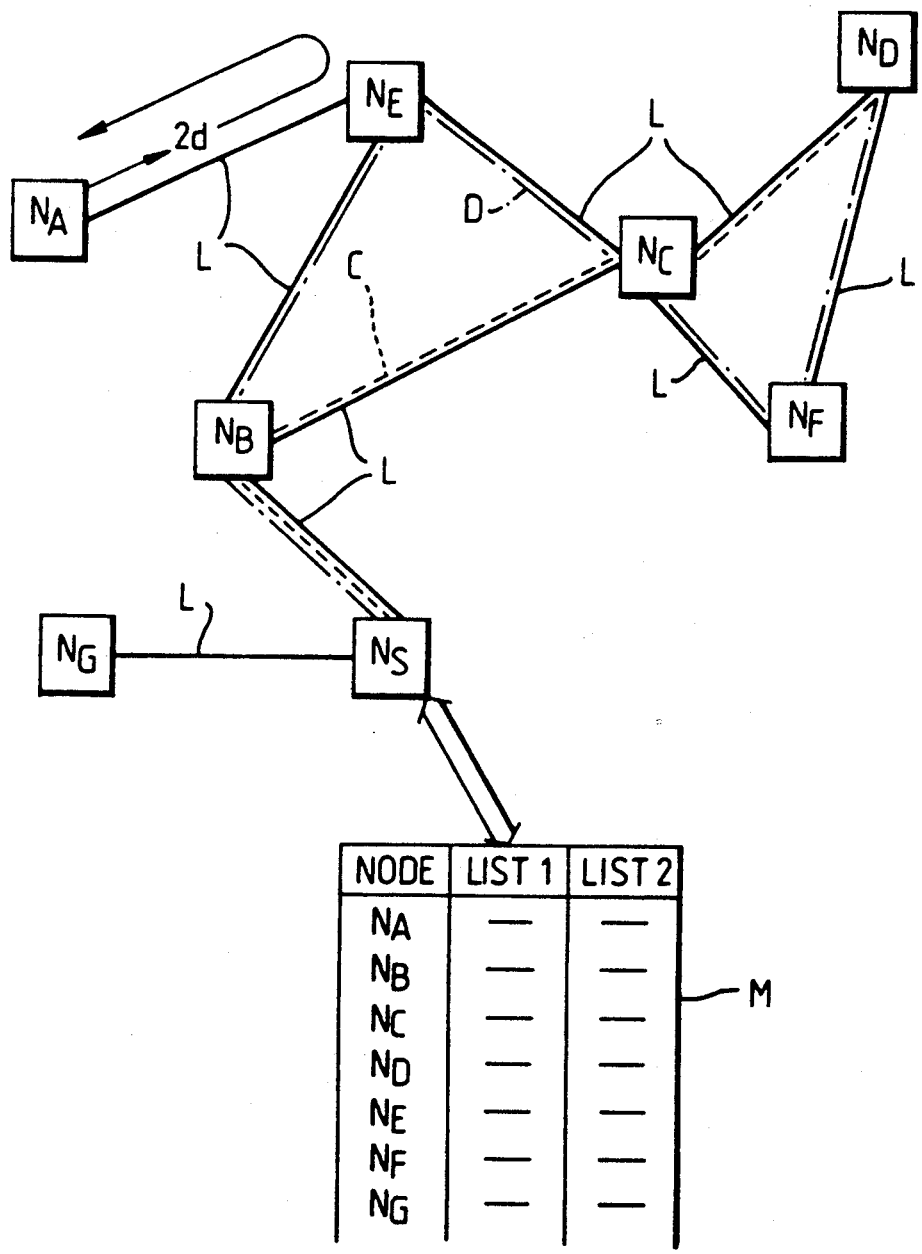
FIG. 1 is a schematic representation of a network in accordance with the present invention (and has already been referred to)
Figure 2:
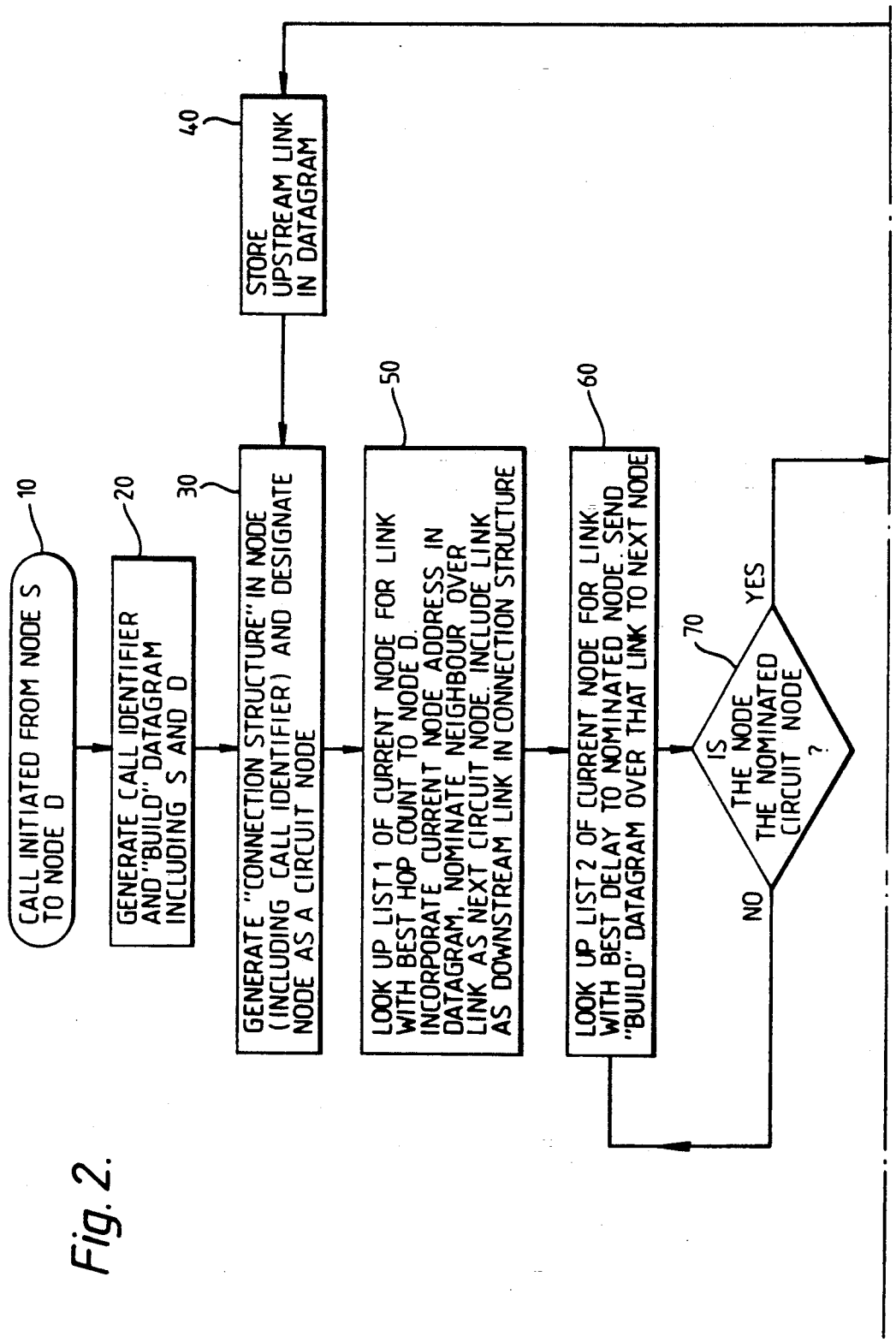
FIG. 2 is a flow diagram illustrating the establishment of a data circuit in a network in accordance with the invention.
Figure 2:
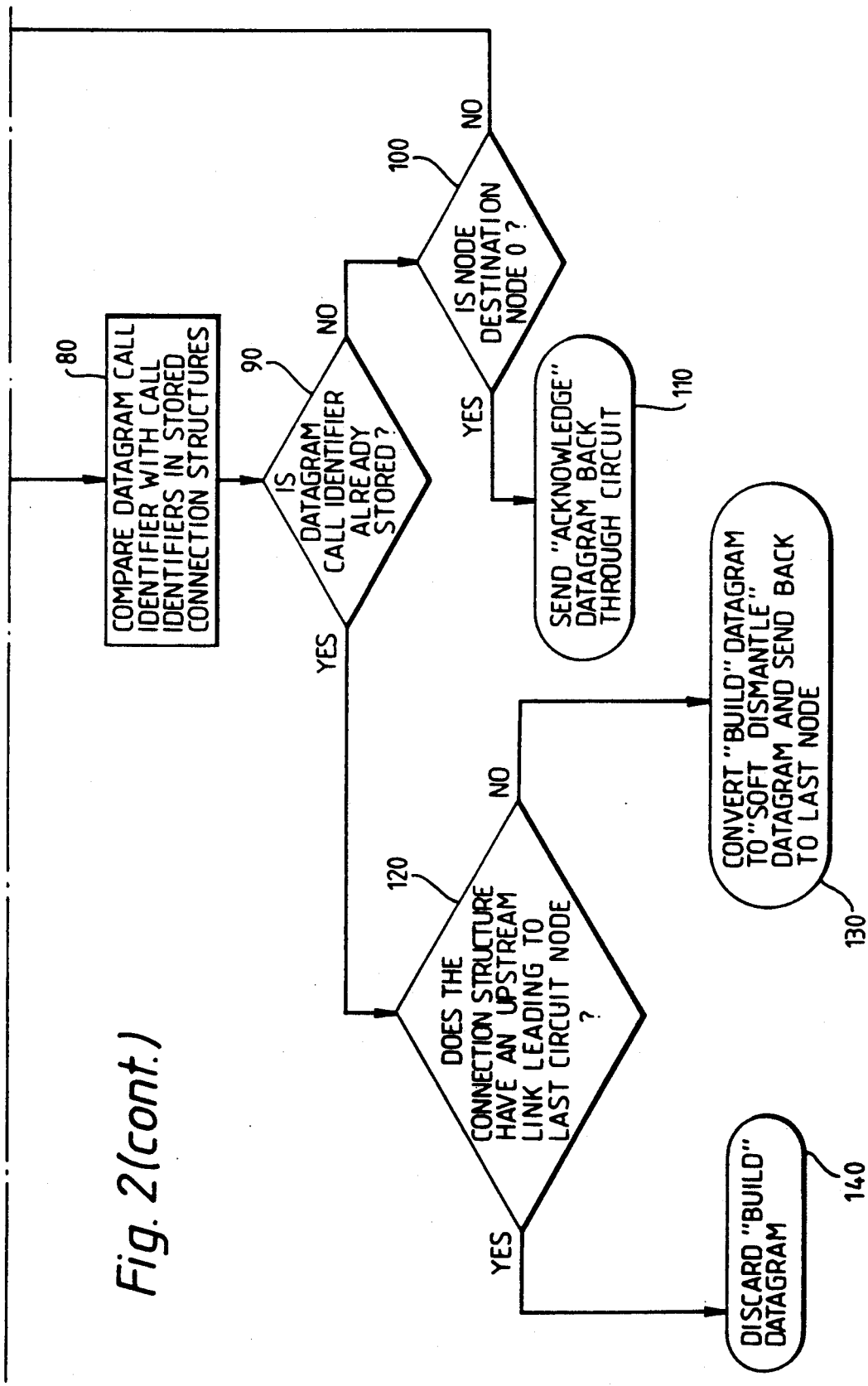
Figure 3:
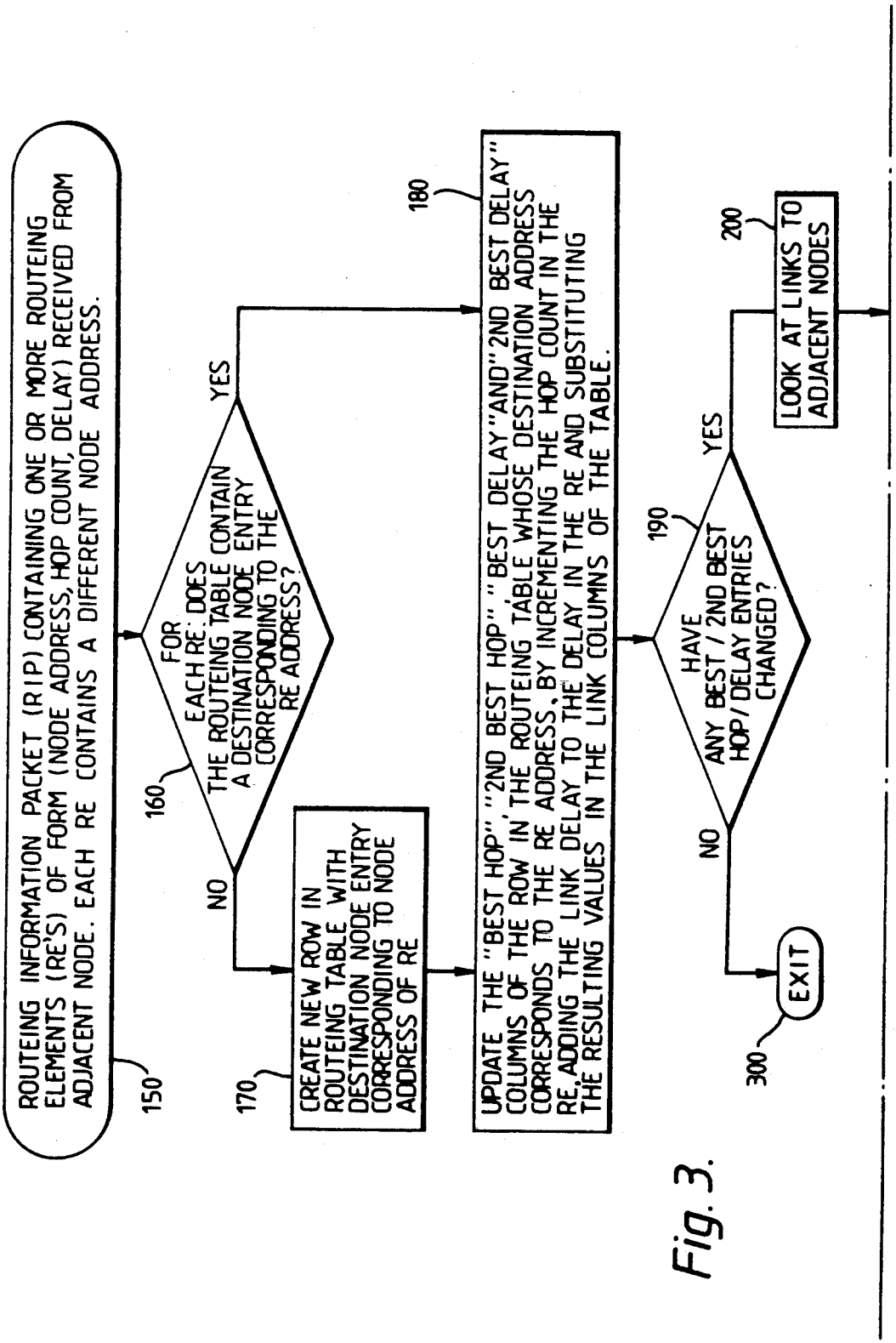
FIG. 3 is a flow diagram illustrating the transmission of updating information between nodes in a network in accordance with the present invention, and FIGS. 4(a)-(4c) are schematic representation of a network in accordance with the invention, showing the effects of changes in the network topology during operation.
Figure 3:
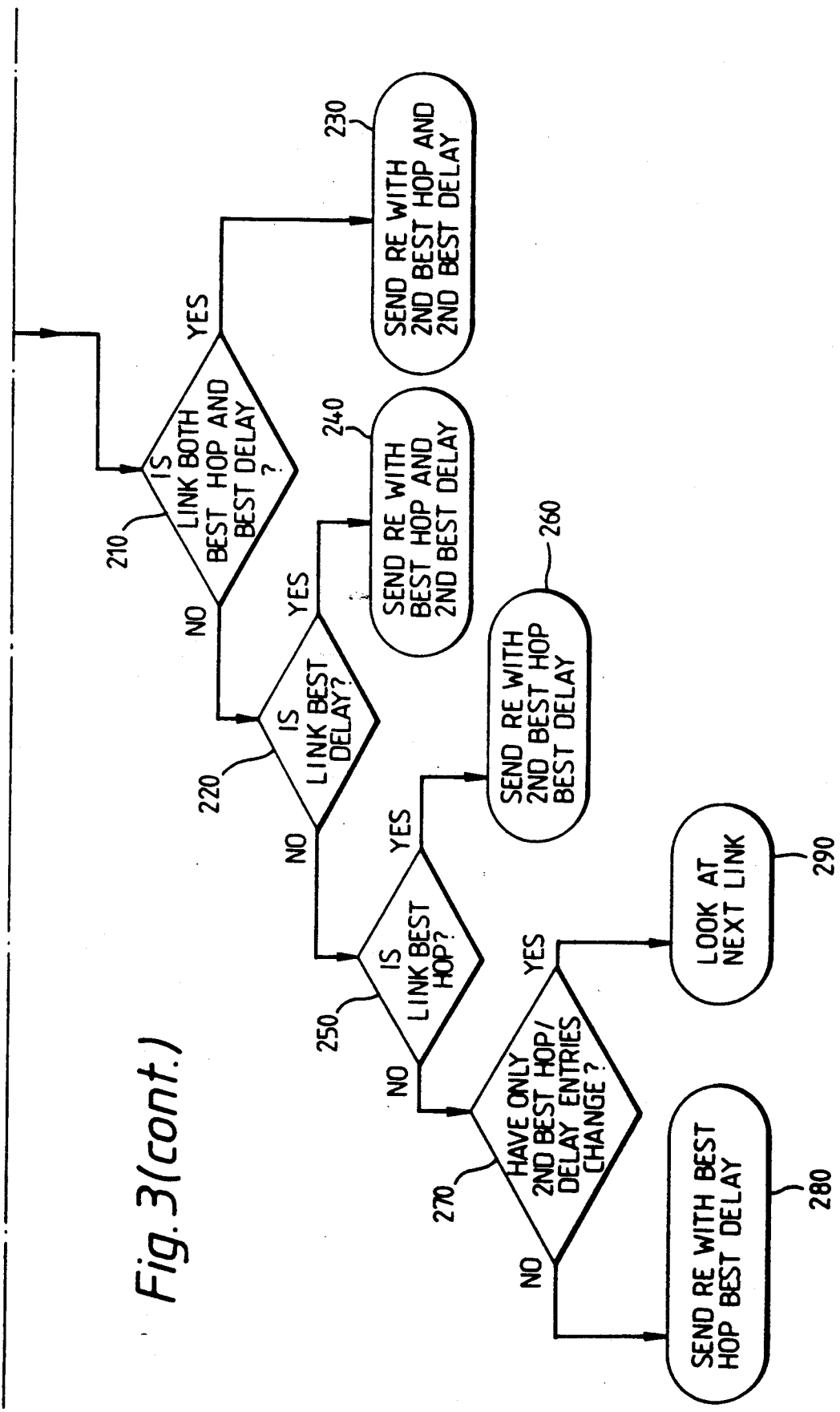
Figure 4A:
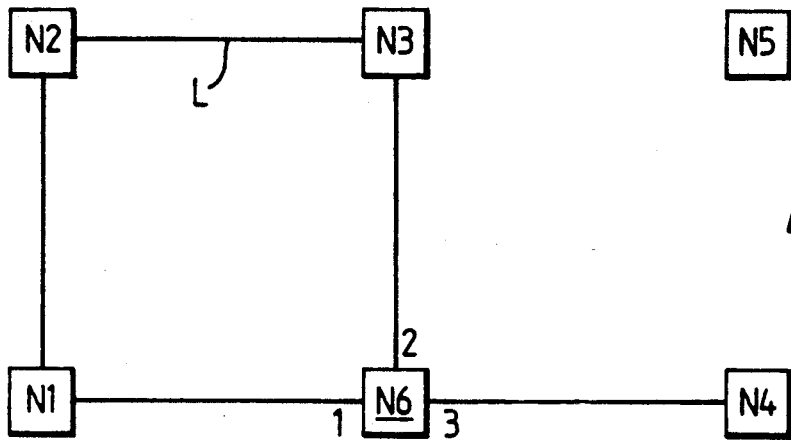
Figure 4B:
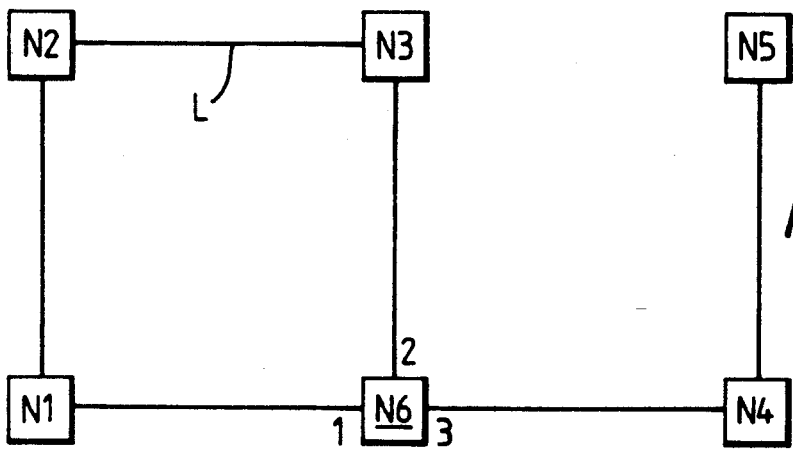
Figure 4C:
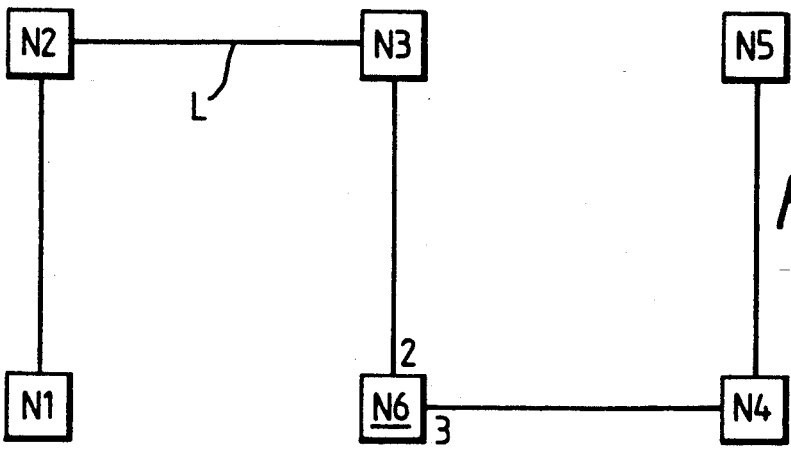

The flow diagram of FIG. 2 applies both to the network of FIG. 1 and the network of FIGS. 4a-4c. However the latter network is more sophisticated than the former in that each of its nodes incorporates third and fourth lists of links to neighbouring nodes, each entry in the third list representing second best hop count and each entry in the fourth list representing second best transmission time. As is described below in detail with reference to FIG. 3, in the network of FIGS. 4(a)-4(c), each node (N) is arranged to communicate changes in its said first, second third and fourth lists to selected neighbouring nodes in dependence on the updated entries in its said first, second, third and fourth lists, each amended link/neighbouring node entry of the first and fourth lists being communicated via that link (L) to a neighbouring node which is the associated entry in the said second list and each amended link/neighbouring node entry of the second and third lists being communicated via that link (L) to a neighbouring node which is the associated entry in the said first list.

Thus the flow diagram shown in FIG. 3, which shows how changes in the lists of each node are communicated to neighbouring nodes, applies only to the network of FIGS. 4(a)-4(c) and not to the network shown in FIG. 1.

Briefly, the way in which the LISTs 1 and 2 of each node in the network of FIG. 1 are updated as follows. As previously noted, each node in the network periodically measures the transmission time to its neighbouring nodes and updates its LIST 2 accordingly. Similarly, each node periodically informs its neighbouring nodes of its continued existence so that every node knows which local nodes can be reached in a single hop. If as a result of monitoring delay and hop count in this fashion, a node changes any of the entries in its LIST 1 or LIST 2 then these changes are communicated over those links to neighbouring nodes which do not correspond to any updated entries. For example if node $N_B$ in FIG. 1 discovered that the transmission time to node $N_S$ had changed, it would update its delay entry in LIST 2 for node $N_S$ and communicate this information over the links L to $N_E$ and $N_C$. When a node receives such updating information, it amends its own LIST 1 and LIST 2 for consistency with this information, by adding the delay due to the link over which the information was received to the delay information and inserting the resultant delay in its LIST 2 and incrementing the received hop count by 1 and substituting the resultant value at the appropriate position in its LIST 1. For example, if node $N_E$ learns from node $N_B$ that the delay between node $N_B$ and node $N_S$ has changed to d' and the delay over the link from node $N_B$ to node $N_E$ is d", then node $N_E$ will know that the minimum transmission time between itself and node $N_S$ is d' plus d" and will insert the value "d'+d'"" in its LIST 2 at the entry adjacent node $N_S$ in its memory. This updating information will then be transmitted to the nodes $N_A$ and $N_C$ which will process the information similarly, and in this manner each node will eventually learn the shortest hop count and the minimum transmission delay to every other node in the network.

The establishment of a circuit in the network of FIG. 1 will now be described in detail with reference to FIG. 2. The procedure beings at step 10, in which a call is initiated from node $N_S$. In step 20, $N_S$ generates a call identifier (which will identify the circuit established between node $N_S$ and node $N_D$) and a BUILD datagram which includes the call identifier and also the node addresses of nodes S and D. The BUILD datagram is described below in further detail.

In step 30, the node $N_S$ is designated as a circuit node and a connection structure is stored in the memory of the node. The connection structure includes the call identifier and also identifies the next downstream circuit node.

In order to guide the BUILD datagram to the next circuit node, in step 50 node $N_S$ looks up its LIST 1 to find that link which will minimise the hop count to node D. The link to node $N_B$ is chosen. The address of node $N_D$ is included in the BUILD datagram and node $N_B$ is nominated as the next circuit node. The link to this node is stored as the downstream link in the connection structure stored in node $N_S$.

In step 60, node $N_S$ looks up its LIST 2 to find the link with the best delay to the nominated node $N_B$ and finds that the best link is the link leading directly from node $N_S$ to $N_B$. Accordingly the BUILD datagram is sent over that link to node $N_B$. In step 70 the processor in node $N_B$ reads the datagram and determines whether node $N_B$ is nominated, but if not, step 60 would be repeated and the datagram sent to the next node as determined by its LIST 2.

In step 80, the call identifier of the BUILD datagram is compared with the call identifiers of any connection structures already stored in node $N_B$. Each connection structure corresponds to a different circuit which is identified by a unique call identifier. If it is found that the call identifier of the BUILD datagram is already stored (step 90), then this is due either to a duplicate BUILD datagram already received at that node or alternatively to a loop in the circuit. The node determines which of these two possibilities has occurred by inspecting the upstream link in the stored connection structure containing the duplicate call identifier (step 120). If the upstream link leads to the circuit node from which the BUILD datagram was sent then the datagram is a duplicate BUILD and is discarded (step 140). Otherwise the BUILD datagram is attempting to form a loop in the circuit, so it is converted to a soft DISMANTLE datagram and sent back to the previous circuit node (step 130), i.e. node $N_S$ in the case of FIG. 1. The function of the soft DISMANTLE datagram is described in more detail below, but briefly the function of this datagram is to cause the previous circuit node to make a further attempt to establish a circuit. The BUILD datagram is only duplicated as a side effect of special circumstances involving link or node failure. For example, suppose that node $N_S$ has nominated node $N_F$ (FIG. 1) to be the next circuit node, and has sent a BUILD datagram via node $N_B$. Node $N_B$ would have sent an acknowledgment to node $N_S$ and would have relayed the BUILD datagram to node $N_C$. Such an acknowledgment need not be described in detail. Now suppose that the acknowledgment is lost and the link between $N_S$ and $N_B$ fails. Node $N_S$ has no way of knowing whether the BUILD datagram was successfully transmitted or not, and so transmits another BUILD datagram. In this manner, two copies of the same BUILD datagram will arrive at node $N_F$.

Accordingly, this possibility is catered for by steps 120 and 140 in the flow diagram of FIG. 2.

Returning now to step 90 in FIG. 2, it will be assumed that the call identifier of the datagram received at node $N_B$ is not already stored in a connection structure in node $N_B$. Node $N_B$ then checks whether it is nominated as a destination node by the datagram (step 100). Since it is not nominated, the upstream link, namely the link between node $N_B$ and node $N_S$ is incorporated in the BUILD datagram (step 40) and a connection structure is generated in node $N_B$ step 30) which includes this upstream link. In step 50, node $N_B$ finds that node $N_C$ is the next circuit node and in step 60, the BUILD datagram is sent over the link to node $N_E$ en-route to node $N_C$. In step 70, node $N_E$ determines that it is not nominated as a circuit node and accordingly the algorithm returns to step 60 and sends the BUILD datagram over the link to node $N_C$. The algorithm then proceeds through steps 80, 90, 100, 40 and 30 and in step 50, node $N_C$ determines that the next circuit node is $N_D$. In step 60, it finds that the route with the least delay to node $N_D$ is via node $N_F$. In step 70, the algorithm determines that node $N_F$ is not nominated as a circuit node and accordingly the algorithm returns to step 60 and sends the BUILD datagram to node $N_D$. The node $N_D$ then implements steps 70, 80, 90 and 100 of the algorithm and since it is indeed the destination node, sends an ACKNOWLEDGE datagram back through the circuit comprising nodes $N_D$, $N_C$, $N_B$, $N_S$. The function of this datagram is simply to inform the caller at node $N_S$ that a circuit has been established to node $N_D$, so that data transmission from node $N_S$ to node $N_D$ can begin. Unless conditions in the network have changed, the ACKNOWLEDGE datagram will be guided back through the network over the same path at D as was traversed by the BUILD datagram. Accordingly, it is not necessary to described the transmission of this datagram in detail.

The representation of the algorithm as given in FIG. 2 is somewhat idealised in that it is assumed that the links L have sufficient capacity to enable a circuit to be established between node $N_S$ and node $N_D$ or any other pair of source and destination nodes in the network. In practice, this is not always possible and accordingly the network provides for three types of dismantle datagrams, namely SOFT DISMANTLE, EXTENDED SOFT DISMANTLE and HARD DISMANTLE datagrams. The various datagrams incorporate the appropriate information required to process connection structures in the nodes as follows:

| BUILD | ACKNOWLEDGE |
|---|---|
| CALL IDENTIFIER | CALL IDENTIFIER |
| SOURCE NODE ADDRESS | SOURCE NODE ADDRESS |
| DESTINATION NODE ADDRESS | DESTINATION NODE ADDRESS |
| SUBDESTINATION NODE ADDRESS | SUBDESTINATION NODE ADDRESS |
| PREVIOUS NODE ADDRESS | PREVIOUS NODE ADDRESS |
| TIME OF TRANSMISSION | TIME OF TRANSMISSION |
| RE-LIST | TIMESLOTS FOR DATAGRAM |
| TIMESLOTS FOR DATAGRAM | HOP COUNT |

| | |
|---|---|
| HOP COUNT | |
| SOFT DISMANTLE | EXTENDED SOFT DISMANTLE |
| CALL IDENTIFIER | CALL IDENTIFIER |
| SOURCE NODE ADDRESS | SOURCE NODE ADDRESS |
| DESTINATION NODE ADDRESS | DESTINATION NODE ADDRESS |
| SUBDESTINATION NODE ADDRESS | SUBDESTINATION NODE ADDRESS |
| PREVIOUS NODE ADDRESS | PREVIOUS NODE ADDRESS |
| TIME OF TRANSMISSION | TIME OF TRANSMISSION |
| TIME SLOTS FOR DATAGRAM | TIME SLOTS FOR DATAGRAM |
| HOP COUNT | HOP COUNT |
| TRY AGAIN FLAG (TRUE OR FALSE) | |
| HARD DISMANTLE | |
| CALL IDENTIFIER | |
| SOURCE NODE ADDRESS | |
| DESTINATION NODE ADDRESS | |
| SUBDESTINATION NODE ADDRESS | |
| PREVIOUS NODE ADDRESS | |
| TIME OF TRANSMISSION | |
| TIME SLOTS FOR DATAGRAM | |
| HOP COUNT | |

It will be seen that each datagram incorporates the following information besides an indication of its category:
CALL IDENTIFIER
SOURCE NODE ADDRESS
DESTINATION NODE ADDRESS
SUBDESTINATION NODE ADDRESS
PREVIOUS NODE ADDRESS
TIME OF TRANSMISSION
TIME SLOTS FOR DATAGRAM
HOP COUNT The call identifier, source node address and destination node address do not require any further explanation. The subdestination node address is the address of the next node in the circuit. The time of transmission is utilised to enable datagrams to be ignored if they have been in existence for so long that their function must have been completed if it is ever going to be completed. The identification of the time slots for the datagram is required by another layer of the network and need not be described in detail. The hop count is simply the number of links traversed by the datagram since it was generated. If the hop count exceeds a predetermined limit (which must be less than or equal to the total number of nodes in the network) the nodes may be programmed to ignore the datagram on the grounds that it has got lost in the network.

The function of the BUILD datagram has already been described in detail. The function of the remaining ACKNOWLEDGE, SOFT DISMANTLE, EXTENDED SOFT DISMANTLE and HARD DISMANTLE datagrams is as follows. When a BUILD datagram arrives at its Destination the circuit has been set up. The BUILD is converted to an ACKNOWLEDGE datagram to be sent back to the source node as an end-to-end acknowledgement. Whenever a source node transmits a BUILD datagram an ACKNOWLEDGE Timeout is set. When the associated ACKNOWLEDGE datagram is received the Timeout is cleared. The ACKNOWLEDGE Timeout is associated with the corresponding Connection Structure (and hence Call Identifier) so that the correct ACKNOWLEDGE datagram can be recognised. Any ACKNOWLEDGE datagram containing a Call Identifier which does not correspond to a Call Identifier in any of the stored Connection Structures causes a HARD DISMANTLE to be sent to dismantle the erroneous circuit being acknowledged. (This situation can occur if a circuit takes so long to set up that the Source tries to set up an alternative. The ACKNOWLEDGE datagram for the first circuit will subsequently be received and so the first circuit must be dismantled).

If the Timeout expires before the ACKNOWLEDGE datagram is received then the Source node assumes that an error has occurred. The circuit set up so far is cleared by the Source sending a HARD DISMANTLE. The Source then tries again with a new BUILD datagram, and with the ACKNOWLEDGE Timeout reset. A new Call Identifier is written into the Connection Structure and the new BUILD datagram. When the ACKNOWLEDGE Timeout expires and the Source node makes another attempt to set up a circuit, an associated Retry Count is decremented. If this reaches zero then it is assumed that the circuit cannot be constructed, so the Connection Structure is deleted and the higher layers of the network are informed. The Retry Count will initially be set to some small integer when the Connection Structure is created. The value of this integer could be chosen by a network manager according to the nature of the particular network. As a guide, DOTI Technical Guide TG101/1 "Intercept Recommendations for Local Area Networks According to the Logical Link Control Access Method" suggests that 4 is a reasonable choice for the maximum number of retries, since this would "allow protection against occasional short duration failures, but provide quick detection of serious problems". Note, however, that this is for a Layer 2 protocol. The same parameter in BT's own Packet SwitchStream is 20.

A node may receive a BUILD datagram nominating it as part of a circuit when it has no outgoing link with sufficient capacity to establish the circuit. If this happens then the BUILD is converted into a SOFT DISMANTLE, its Try Again flag is set to FALSE and the datagram is dispatched back to the previous circuit node. The SOFT DISMANTLE datagram dismantles the circuit back to the neighbouring upstream circuit node so that it can choose a different link to continue the circuit.

When a circuit node receives a SOFT DISMANTLE the Try Again flag is inspected. If it is set to TRUE then the same link may be tried again, so the SOFT DISMANTLE datagram is converted to a BUILD datagram and dispatched to the same downstream circuit node that was chosen before. If the Try Again flag is set to FALSE then another link must be chosen (as will be described below) and the SOFT DISMANTLE is similarly converted to a BUILD and dispatched. If there are no links available then the SOFT DISMANTLE datagram is dispatched to dismantle the circuit further.

The SOFT DISMANTLE is used to dismantle part of a circuit with a view to trying to construct an alternative route from an intermediate circuit node. Normally the SOFT DISMANTLE is transmitted from a circuit node back upstream to its predecessor. There are, however, occasions when it is necessary to dismantle all the way back to the Source to permit another attempt. The EXTENDED SOFT DISMANTLE is used for this.

When a circuit node receives an EXTENDED SOFT DISMANTLE the datagram is dispatched towards the next upstream circuit node and the associated Connection Structure is then deleted.

When the Source receives the EXTENDED SOFT DISMANTLE it makes another attempt to construct a circuit. If the Retry Count reaches zero then the Connection Structure is deleted and higher protocol layers are informed.

Whenever a circuit node has to send a control datagram to another circuit node then the address of the receiving node is written into the Subdestination field before the datagram is dispatched. The address of the transmitting node is written into the PrevoiusNode field, ("PREVIOUS NODE ADDRESS" in the lists of pages 14 and 15) if the datagram is a BUILD or a SOFT DISMANTLE.

All of these control datagrams travel from one circuit node to another by the shortest route with respect to delay, not necessarily by the direct link joining the two nodes.

The above description of the construction of data circuits in the network of FIG. 1 by means of the algorithm of FIG. 2, utilising the BUILD, ACKNOWLEDGE and various DISMANTLE datagrams assumes that each node incorporates in its memory means a list of other nodes in the network and a LIST 1 of the best hop count links to each of those nodes and a LIST 2 of the best delay links to each of those nodes. Such information can either be stored permanently when the network is set up or it can be updated by arranging for each node to communicate changes in its first and/or second lists to neighbouring nodes. If the nodes are arranged to communicate changes in their lists to neighbouring nodes, it is a preferred feature of the invention that each amended list entry of a given node is communicated only via those links to neighbouring nodes which do not correspond to that entry. As noted above this feature alleviates the problems of "ping-pong" type looping, for the reasons explained mathematically in the Shin and Chen paper referred to above. However this feature can be explained in simple terms with reference to FIG. 1. It will be recalled that the route with the shortest delay from node $N_C$ to $N_D$ is via node $N_F$. Suppose that $N_C$ has just learnt this information from a neighbouring node and has updated its LIST 2 accordingly. It has to decide whether to communicate this updating information to its neighbouring nodes, including node $N_F$ (which is assumed not to know the route with the least delay between $N_C$ and $N_D$). However if node $N_C$ does communicate this information (namely that this link is the best delay link for communications between $N_C$ and $N_D$) directly to node $N_F$ over their common link then node $N_F$ may incorrectly deduce that the best delay route from $N_F$ to $N_D$ is over the link to $N_C$, back in the reverse direction to $N_F$, and then over the link to $N_D$. If this incorrect deduction is made, then any datagram transmitted from node $N_C$ to node $N_F$ en-route to node $N_D$ will ping-pong indefinitely between nodes $N_C$ and $N_F$. In normal circumstances, node $N_F$ will know that the quickest route to node $N_D$ is via the direct link L to that node. However in some circumstances that link may not be available, e.g. due to failure or lack of capacity.

It should be noted that an analogous argument applies to the communication of changes to LIST 1, the list of links with the best hop count to various destination nodes.

In the embodiment of FIG. 1, the problem of "ping-pong" type looping can be avoided simply by ensuring that any amended list entry (i.e. a link) is not transmitted over that link.

In the embodiment of FIGS. 3 and 4(a)–4(c), a more sophisticated procedure is employed and each node is arranged to maintain a routing table in its memory which incorporates, besides the list of best hop count links and list of best delay links (corresponding to LISTs 1 and 2 respectively of FIG. 1), a third list of second best hop count links and a fourth list of second best delay links.

The algorithm for communicating changes in the first, second, third and fourth lists of each node will first be described with reference to FIG. 3, before describing an example of such updating with reference to FIGS. 4(a)–4(c).

Changes in the lists of each node are communicated in the form of routing information packets (RIP's) each containing one or more routing elements (RE's) of the form: (node address, hop count, delay).

The node address in any RE transmitted by a given node is the address of a destination node, which will typically be a distant node in the network. The hop count and delay in the RE are the lowest hop count and shortest delay between the node in question and the destination node. It will be noted that the RE's do not contain any explicit information which identifies the link with the best hop count and the link with the best delay which lead to the destination node whose address is given in the RE. However, as will become clearer, this information can be deduced from the information already present in the routing table of the node which receives the RE in conjunction with the identity of the link over which the RE is received.

In FIG. 3, the first step 150 involves the reception of an RIP containing one or more RE's from an adjacent node. It should be noted that each RE contains a different node address.

In step 160, the algorithm considers the routing table of the node which receives the RIP and in respect of each RE determines whether the routing table contains a destination node entry corresponding to the node address given in the RE. The algorithm then proceeds to step 180, creating a new row in the routing table with the required destination node entry (step 170) if necessary.

In step 180 the algorithm increments the hop count in the RE, adds the delay due to the link over which the RE was received to the delay given in the RE and substitutes the resulting values in link columns of the routing table. Examples of such link columns are shown as the three right hand columns in table 2 on p. 22 (which will be described in more detail below) but at this stage it should be noted that each link column is a list of hop, delay combinations over a given link from the node in which the routing table is stored to the various destination nodes listed in the left hand column of the table. As will subsequently be described, these link column entries are utilised to update lists 1, 2, 3 and 4.

The algorithm then determines whether any of the best or second best hop or delay entries have changed as a result of the new information stored in the routing table (step 190) and if no changes have been made, exit from the process (step 300). In this case, no updating information is transmitted as a result of the receive outdating information in the RIP.

If however any of the best or second best hop or delay entries have changed, the algorithm considers the links to adjacent nodes (step 200) and in respect of each link, determines whether that link is both the best hop link and the best delay link to the destination node whose node address is given in the receive RE (step 210). This is to ensure that "best hop" information is not sent over the best hop link and that "best delay" information is not sent over the best delay link, in order to avoid "ping-pong" type looping. (If a link is both the best hop link and the best delay link (i.e. the link over which a datagram should be sent from the node which has received the RE in order to minimise both hop count and delay) then the routing table of the node is examined and a new RE with the second best hop count and second best delay to the destination node is sent over that link (step 230).

If the link is not both the best hop and best delay link, the algorithm then considers whether the link is merely the best delay link (step 220) and if it is, since it knows from step 210 that it is not the best hop link, it is free to send an RE with the best hop and second best delay over that link (step 240).

If the link examined by the algorithm in step 220 is not the best delay link the algorithm then examines the routing table to determine whether the link being examined is the best hop link (step 250). If it is, then the algorithm knows that it cannot send an RE with the best hop over that link and accordingly it sends an RE with the second best hop and best delay (step 260) to the destination node of the received RE.

If the outcome of step 250 is negative, then the algorithm knows that the link it is examining is neither the best hop link nor the best delay link to the destination node of the received RE. However it may be that only the second best hop and delay entries in the routing table have changed in which case there is no new best hop, best delay information to be sent. This in checked in step 270, and if the answer is affirmative, the algorithm then proceeds to examine the next link radiating from the node which has received the RIP (step 290).

If the answer to the above query is negative, then an RE with the best hop and best delay is sent over that link. The algorithm considers each link in turn in this manner.

Because of the specific manner in which the RE's are guided to the outgoing links from each node, any node which receives an RE can deduce from the link over which that RE is received and the information is its routing table which of its own links will provide the shortest delay and lowest hop count to any given destination node. This will now be explained by way of example only with reference to FIGS. 4(a)–4(c).

FIG. 4(a) shows a network comprising nodes N1, N2, N3, N4 and N6, with node N5 about to be connected. The following description will concentrate on the routing table of node N6, whose links L to neighbouring nodes N1, N3 and N4 are numbered 1, 2 and 3 respectively.

As in the network in FIG. 1, each node periodically transmits a timing package to its neighbouring node in order to measure the delay to those neighbouring nodes. Additionally, each node keeps a record of the spare data-carrying capacity of each of its links. This information is stored in a link value table in each case. The link value table for node N6 is as follows:

TABLE 1

| Link | 1 | 2 | 3 |
|---|---|---|---|
| Delay | X | X | X |
| Spare Capacity | X | X | X |
| Neighbour | N1 | N3 | N4 |

An entry of X denotes a value which is known by the node but not relevant to this invention. The routing table of node N6 is as follows:

TABLE 2

| Destination node | Best Hop (List 1) | 2nd Hop (List 3) | Best Delay (List 2) | 2nd Delay (List 4) | Hop, Delay for Link | | |
|---|---|---|---|---|---|---|---|
| | | | | | 1 | 2 | 3 |
| N1 | 1 (1) | 3 (2) | X (X) | X (X) | 1,X | 3,X | NULL |
| N2 | 2 (1) | 2 (2) | X (X) | X (X) | 2,X | 2,X | NULL |
| N3 | 1 (2) | 3 (1) | X (X) | X (X) | 3,X | 1,X | NULL |
| N4 | 1 (3) | (5 (1)) (5 (2)) | X (X) | X (X) | 5,X | 5,X | 1,X |

The routing table comprises a list of destination nodes N1, N2, N3 and N4 which can be reached from N6 and four lists showing the best available hop count and best available delay to each of these destination nodes. The values in brackets refer to the link radiating from node N6 which must be traversed in order to achieve the indicated best or second best hop or delay value. For example the lowest hop count from node N6 to node N2 is 2 which may be achieved either by traversing link 1 or by traversing link 2 from node N6. Since both these links lead to the same hop count, the former is listed in the best hop count column (LIST 1) on the grounds that the route which includes this link has a lower delay than the route which includes link 2. For the sake of clarity however the delays and links corresponding to these delays are not indicated specifically in the routing tables but are merely represented as X entries. It will be noted that the second best hop count from node N6 to N4 is 5 and that this may be achieved either by exiting from link 1 to node 1 and then travelling to nodes 2, 3, 6 and 4 is succession, or by exiting from link to 2 and then travelling to node 3, 2, 1, 6 and 4 in succession. Since both these routes will have the same delay, both entries are bracketed together in LIST 3. But they will not both be stored in the real LIST 3.

It is now assumed that node N5 is added to the network by adding a link between N5 and N4 as shown in FIG. 4(b). Node 4 sends the RE (4, 0, 0) to node and N5 to indicate its existence. Similarly, node N5 sends the RE (5, 0, 0) to node N4. It will be recalled that each RE is in the form (node address, hop count, delay). Node N4 then knows that node N5 is one hop away from it so it sends the RE (5, 1, X) to node N6. It will be recalled that the value 5 represents the address of node N5, the value 1 is the hop count from node N4 to node N5 and the value X (which will be ignored for the time being) is the delay from node N4 to node N5. Node N6 then updates its routing table to the following:

TABLE 3

| Destination node | Best Hop (List 1) | 2nd Hop (List 3) | Best Delay (List 2) | 2nd Delay (List 4) | Hop, Delay for Link 1 | 2 | 3 |
|---|---|---|---|---|---|---|---|
| N1 | 1 (1) | 3 (2) | X (X) | X (X) | 1,X | 3,X | NULL |
| N2 | 2 (1) | 2 (2) | X (X) | X (X) | 2,X | 2,X | NULL |
| N3 | 1 (2) | 3 (1) | X (X) | X (X) | 3,X | 1,X | NULL |
| N4 | 1 (3) | 5 (1) 5 (2) | X (X) | X (X) | 5,X | 5,X | 1,X |
| N5 | 2 (3) | −1 (—) | X (3) | −1 (—) | NULL | NULL | 2,X |

Changes in the routing table are underlined. It should be noted that the entries of −1 in the second hop and second delay columns (Lists 3 and 4 respectively) for destination node N5 are taken to indicate that the second best hop and second best delay to N5 are infinite, i.e. there is only one route from node N4 to N5. Node N6 then sends the RE (5, 2, X) to nodes N3 and N1, which then notify node N2. Node N2 then knows it can reach node N5 in four hops via node N3, and therefore sends the RE (5, 4, X) to node N1. The same RE is also sent to node N3. Node N1 then sends the RE (5,5,X) to node N6, whose routing table is as follows (changes being underlined):

TABLE 4

| Destination node | Best Hop (List 1) | 2nd Hop (List 3) | Best Delay (List 2) | 2nd Delay (List 4) | Hop, Delay for Link 1 | 2 | 3 |
|---|---|---|---|---|---|---|---|
| N1 | 1 (1) | 3 (2) | X (X) | X (X) | 1,X | 3,X | NULL |
| N2 | 2 (1) | 2 (2) | X (X) | X (X) | 2,X | 2,X | NULL |
| N3 | 1 (2) | 3 (1) | X (X) | X (X) | 3,X | 1,X | NULL |
| N4 | 1 (3) | 5 (1) 5 (2) | X (X) | X (X) | 5,X | 5,X | 1,X |
| N5 | 2 (3) | 6 (1) | X (X) | X (X) | 6,X | NULL | 2,X | node N3 sends the RE (5, 5, X) to node N6, whose table then becomes (assuming that node N1 has already sent its RE):

TABLE 5

| Destination node | Best Hop (List 1) | 2nd Hop (List 3) | Best Delay (List 2) | 2nd Delay (List 4) | Hop, Delay for Link 1 | 2 | 3 |
|---|---|---|---|---|---|---|---|
| N1 | 1 (1) | 3 (2) | X (X) | X (X) | 1,X | 3,X | NULL |
| N2 | 2 (1) | 2 (2) | X (X) | X (X) | 2,X | 2,X | NULL |
| N3 | 1 (2) | 3 (1) | X (X) | X (X) | 3,X | 1,X | NULL |
| N4 | 1 (3) | 5 (1) 5 (2) | X (X) | X (X) | 5,X | 5,X | 1,X |
| N5 | 2 (3) | 6 (1) 6 (2) | X (X) | X (X) | 6,X | 6,X | 2,X |

Now suppose that the link 1 from node N6 to node N1 fails. As a result, the network shown in FIG. 4 (b) is converted to the form shown in FIG. 4 (c).

Since each node is arranged to monitor each of its links to a neighbouring node, node N6 detects the failure of link 1. Accordingly the routing table of node N6 is updated as follows:

TABLE 6

| Destination node | Best Hop (List 1) | 2nd Hop (List 3) | Best Delay (List 2) | 2nd Delay (List 4) | Hop, Delay for Link 1 | 2 | 3 |
|---|---|---|---|---|---|---|---|
| N1 | 3 (2) | −1 (—) | X (X) | X (X) | | 3,X | NULL |
| N2 | 2 (2) | −1 (—) | X (X) | X (X) | | 2,X | NULL |
| N3 | 1 (2) | −1 (—) | X (X) | X (X) | | 1,X | NULL |
| N4 | 1 (3) | 5 (2) | X (X) | X (X) | | 5,X | 1,X |
| N5 | 2 (3) | 6 (2) | X (X) | X (X) | | 6,X | 2,X |

Changes in the list entries are underlined and it will be seen that the best hop entries to nodes N1 and N2 have changed and that the second best hop entries to nodes N1, N2, N3, N4 and N5 have changed. In accordance with step 190 of FIG. 3, these changes are communicated to the nodes neighbouring N6, namely nodes N3 and N4. It should be noted that in general, changes in the list entries of a node which result from the receipt of an RE via a given link radiating from that node are not transmitted back over that link since the node at the other end of that link will already be aware of the relevant information.

The transmission of the RIP's from N6 to N3 and N4 is governed by steps 200 to 290 of FIG. 3.

The following RE's are transmitted to node N3:

(1, −1, −1) Node N6's best route to node N1 is now via node 3, and the second best route would normally be sent and there is not one now.

(2, −1, −1) Node N6's best route to node N2 is now via node N3.

(3, −1, −1) Node N6's best route to node N3 was via link 2, and still is. The second best information has changed and would therefore be the information sent to node 3. However, there is now no second best and so the negative RE is sent.

Node 6 also sends an RIP to node N4 containing the following RE's:

(1, 3, X)
(2, 2, X)
(4, 5, X)
(5, 6, X).

It should be noted that the RE's sent to node N4 via link 3 from node N6 do not include the node address of node N3. This is because only the second best hop count from N6 to N3 has changed and the processing proceeds via steps 200, 220, 250 and 270 and thence to the next link via step 290, without sending any RE. It should also be noted that node N6 does not know at this stage that the second best hop entries are in respect of an alternative circuit via itself. It will learn this later when an attempt via link 2 causes node N1 to return a DISMANTLE datagram with its Try Again flag set to FALSE.

Finally, N1 will also have learnt that its link to node N6 has failed and will update its routing table accordingly and communicate any changes to node N2 in accordance with the algorithm shown in FIG. 3.

It is a preferred feature of the invention that each node is arranged to store in its memory means, in respect of each of its links, a list of pointers to stored connection structures in which that link is an upstream link in a data transmission circuit passing through that node, and a list of pointers to stored connection structures in which that link is a downstream link in a data-transmission circuit passing through that node, the node being arranged to detect failure of any of its links, to search the lists of pointers relating to any failed link, and to send datagrams over each remaining link of the connection structures indicated by the pointers relating to the failed link, each connection structure including an upstream link which is directed towards a source node and a downstream link which is directed towards a destination node, each said datagram which is sent via an upstream link being arranged to instruct the associated source node to attempt to establish an alternative circuit and each said datagram which is sent via a downstream link being arranged to cancel the downstream portion of the circuit which is interrupted by the link failure.

This feature will now be described by way of example with reference to the network of FIG. 4 (a). It is assumed that there are 4 connection structures stored in the memory means of node N6, namely connection structures 10, 20, 30 and 40, each defined by a different combination of upstream and downstream link. These are shown in Table 7 (a):

As a consequence of the dismantling of a circuit employing best hop count links, it may become necessary to construct an alternative circuit by searching the stored list of all possible links which can be utilized to reach a given destination node. This is reflected in the connection structure format of preferred embodiments of the invention, which is as follows:

Connection Structure

CALL IDENTIFIER
UPSTREAM LINK
DOWNSTREAM LINK
BEST HOP LINK
BEST HOP LINK TRIED? (Y OR N)
2ND BEST HOP LINK
2ND BEST HOP LINK TRIED? (Y OR N)
LINK LIST

TABLE 7

CONNECTION STRUCTURE LIST
FOR LINK 1 of NODE N6

|   | CONNECTION STRUCTURE | UPSTREAM LINK | DOWNSTREAM LINK |   | UPSTREAM POINTER | DOWNSTREAM POINTER |
|---|---|---|---|---|---|---|
| a) | 10 | 1 | 2 |    | 10 | 30 |
|    | 20 | 1 | 3 | b) | 20 |    |
|    | 30 | 3 | 1 |    |    |    |
|    | 40 | 3 | 2 |    |    |    |

Table 7 (b) shows the upstream and downstream pointers for link 1 of node N6. Thus link 1 is an upstream link in connection structures 10 and 20 and is a downstream link in connection structure 30. Besides the LISTs 1 to 4 shown in the routing tables of tables 2 to 5, the memory of each node in the network of FIG. 4 incorporates a list of all the links other than the best hop, second best hop, best delay and second best delay links which can be used to reach each listed destination node. It so happens that in the case of the network of FIG. 4 the additional list would be empty in the case of each node, because the nodes have insufficient links. However if the topology of the network changed, for example as a result of the creation of a link between node N6 and node N5 then the additional list in the memory of node N6 would be filled. The purpose of such an additional link is to enable an alternative circuit to be established in the event of the failure of a best or second best hop link. For example, on detecting the failure of link 1 from node 6 in FIG. 4 (c) the processor of node N6 would search the list of upstream pointers of Table 7 (b) and would then be directed to connection structures 10 and 20 in Table 7 (a). The processor would then send a HARD DISMANTLE datagram down its downstream link 2 (in respect of connection structure 10) and would send a HARD DISMANTLE datagram down downstream link 3 (in respect of connection structure 20) in order to dismantle the downstream portions of the respective circuits leading from these two connection structures. Similarly, the processor would search the list of downstream pointers of Table 7 (b) and would thereby locate downstream pointer 30 in Table 7 (a). It would then send an EXTENDED SOFT DISMANTLE datagram up through upstream link 3 to the upstream portion of the circuit corresponding to the connection structure 30.

In this way, data circuits which rely on a failed link are dismantled. It may also be necessary to dismantle a data circuit because a link in the circuit has insufficient capacity.

LINK LIST TRIED? (Y OR N)
NODE TYPE (SOURCE, DESTINATION OR INTERMEDIATE CIRCUIT NODE)

The call identifier identifies the circuit of the upstream and downstream link entries indicate the link overwhich the data is being received at the node in question and the link via which the data of that circuit is transmitted from the node in question. The best hop link is the link appearing in LIST 1 of the node in question for the destination node of the circuit. The connection structure also records whether this best hop link has been tried in an attempt to construct the circuit. Similarly the second best hop link (appearing in LIST 3) is recorded and it is indicated whether this second best hop link has been tried. The link list entry is simply a list of all remaining links from the node in question which could be utilised to establish the circuit identified by the call identifier.

The variable "LINK LIST TRIED?" indicates whether it has been necessary to search through the link list in an attempt to construct the circuit and finally the variable "NODE TYPE" indicates whether the node in question is a source node, a destination node or an intermediate circuit node. A failure in the network may mean that there is no longer a route from a given source node to a destination node and a circuit cannot be constructed. The source node will eventually learn of this in one of three ways:

(i) The source receives an RIP containing a negative RE for the destination node.
(ii) The source node receives a SOFT DISMANTLE datagram and the number of retries at establishing the circuit has reached a predetermined limit. A counter is provided in order to count the number of attempts at establishing a given circuit in each node.
(iii) No ACKNOWLEDGE datagram is received by the source node within a predetermined time limit after transmission of a BUILD datagram and the maximum number of retries has been reached.

For the sake of clarity, the additions to the Routing Tables to accommodate the above-described connection structure format have not been described. However they will be apparent to those skilled in the art from the preceding description.

I claim:

1. A distributed communications comprising:

a plurality of nodes which are each capable of acting as source, sub-destination and destination nodes, the nodes being interconnected by links and each node having local processing and memory means, each node including in its memory means a stored list of destination nodes in association with a first stored list and a second stored list of its links of neighboring nodes, each entry in the stored list of destination nodes being associated with a respective link or neighboring node in said first stored list and in said second stored list, the processing means being arranged such that a datagram can be sent between one of said nodes acting as a source node and another of said nodes acting as a destination node via one or more other of said nodes acting as sub-destination nodes in response to the source node calling the destination node, each sub-destination node being determined by the link or neighboring node selected from said first stored list in the source node or in a preceding sub-destination node, the datagram being arranged to designate at least some of said sub-destination nodes as circuit nodes and to store circuit data in the memory means for the circuit nodes, said circuit data establishing a temporary circuit for date transmission between the source and destination nodes via said circuit nodes, each node traversed by said datagram which is not the source node, the destination node or a circuit node being determined by selecting that link or neighboring node from said second stored list in the immediately preceding node which is associated with a following designated circuit node in the path of the datagram, the criteria on which said first and second stored lists in each node are based being distinct and being biased towards optimum transmission of said data in said temporary circuit and optimum establishment of said temporary circuit, respectively.

2. A distributed communications network as in claim 1, wherein link or neighboring node entries in said first stored list of said nodes are those entries which minimize hop-count for circuits of said nodes to the respective destination nodes.

3. A distributed communications network as in claim 2, wherein link or neighboring node entries in said second stored list of said nodes are those entries which minimize the time taken for the datagram to travel to a next successive circuit node for circuits to the respective destination nodes.

4. A distributed communications network as in claim 3, wherein:

each node is arranged to update its second stored list in response to delay information received from a neighboring one of said nodes which relates to the transmission delay between that neighboring node and a distant one of said nodes in the network, each node being arranged to add to said transmission delay the additional delay associated with receiving the delay information over the link from the neighboring node, to transmit the resulting total delay information to its other neighboring nodes if any, and to measure said additional delay by transmitting and receiving a timing packet over the link via which the delay information was received.

5. A distributed communications network as in claim 3, wherein each node is arranged to update its first stored list in response to hop-count information received from a neighboring one of said nodes which relates to hop-count between that neighboring one of said nodes and a distant node in the network, each node being arranged to increment the hop-count information from a neighboring node and to communicate the incremented hop-count to its other neighboring nodes if any.

6. A distributed communications network as in claim 5, wherein:

each node is arranged to update its second stored list in response to delay information received from a neighboring one of said nodes which relates to the transmission delay between that neighboring node and a distant one of said nodes in the network.

7. A distributed communication network as in claim 6, wherein the nodes are arranged to give the transmission of data for updating said stored lists priority over the transmission of datagrams governing the establishment and release of circuits and to give priority to the transmission of said datagrams over the transmission of data in the circuits established by such datagrams.

8. A distributed communications network as claimed in claim 6 wherein each node is arranged to communicate changes in at least one of its said first and said second stored lists to selected neighboring nodes in dependence upon the updated entries in said at least one of its said first and said second stored lists, each updated link or neighboring node entry being communicated via only those links to neighboring nodes which do not correspond to that entry.

9. A distributed communications network as in claim 8 wherein each node further includes third and fourth stored lists of its links or neighboring nodes, each destination node in the stored list of destination nodes being associated with the link or neighboring node in said third and fourth stored lists, the criteria on which the entries in said third and fourth stored lists are based being distinct and being biased towards near optimum transmission of said data in said temporary circuit and near optimum establishment of said temporary circuit, respectively, and wherein each node is arranged to communicate changes in its said first, second, third and fourth stored lists to selected neighboring nodes in dependence on the updated entries in its said first, second, third and fourth stored lists, each updated link or neighboring node entry of the first and fourth stored lists being communicated via that link to a neighboring node which is the associated entry in the said second stored list and each updated link or neighboring node entry of the second and third stored lists being communicated via that link to a neighboring node which is the associated entry in the said first stored list.

10. A distributed communications network as in claim 1 wherein each node is responsive to conditions in the network to update at least one of its said first and said second stored lists, each node being arranged to communicate changes in at least one of its said first and said second stored lists to its neighboring nodes and to modify at least one of its said first and said second stored list in response to updating information received from its neighboring nodes.

11. A distributed communications network as in claim 10, wherein each node further includes third and fourth stored lists of its links or neighboring nodes, each destination node in the stored list of destination nodes being associated with the link or neighboring node in said third and fourth stored lists, the criteria on which the entries in said third and fourth stored lists are based being distinct and being biased towards near optimum transmission of said data in said temporary circuit and near optimum establishment of said temporary circuit, respectively.

12. A distributed communications network as in claim 11, wherein link or neighboring node entries in said third stored list of said nodes represent sub-optimal hop-count for circuits to the respective destination nodes and link or neighboring node entries in said fourth stored list of said nodes represent sub-optimum time taken for the datagram to travel a successive sub-destination node for circuits to the respective destination nodes.

13. A distributed communications network as in claim 10 wherein each node is arranged to communicate changes in at least one of its first and said second stored lists to selected neighboring nodes in dependence upon the updated entries in said at least one of its said first and said second stored lists, each updated link or neighboring node entry being communicated via only those links to neighboring nodes which do not correspond to that entry.

14. A distributed communications network as in claim 13 wherein each node further includes third and fourth stored lists of its links or neighboring nodes, each destination node in the stored list of destination nodes being associated with the link or neighboring node in said third and fourth stored lists, the criteria on which the entries in said third and fourth stored lists are based being distinct and being biased towards near optimum transmission of said data in said temporary circuit and near optimum establishment of said temporary circuit, respectively, each node further including third and fourth stored lists of its links or neighboring nodes, each destination node in the stored list of destination nodes being associated with the link or neighboring node in said third and fourth stored lists, the criteria on which the entries in said third and fourth stored lists are based being distinct and being biased towards near optimum transmission of said data in said temporary circuit and near optimum establishment of said temporary circuit, respectively, and each node being arranged to communicate changes in its said first, second, third and fourth stored lists to selected neighboring nodes in dependence on the updated entries in its said first, second, third and fourth stored lists, each updated link or neighboring node entry of the first and fourth stored lists being communicated via that link to a neighboring node which is the associated entry in the said second stored list and each updated link or neighboring node entry of the second and third stored lists being communicated via that link to a neighboring node which is the associated entry in the said first stored list.

15. A distributed communications network as in claim 12, 6, 7, 8, 9, 13 or 14, wherein each node is arranged to communicate updating information to neighboring nodes for updating their first and said second stored lists, said updating information being communicated within routing information packets, each routing information packet containing at least one routing element which includes a node address and the entries for that node address in said first and said second stored lists, there being at most one routing element corresponding to each node address in a single routing information packet.

16. A distributed communications network as in claim 5, 4, 10, 11, 12, 6, 7, 8, 13, or 14 wherein each new node is arranged to indicate its existence to its neighboring nodes by sending them an identification routing information packet comprising its own node address and entries of zero for said first and second stored lists of its neighboring nodes.

17. A distributed communications network as in claim 1 wherein said circuit data stored by the datagram which is sent from the source node includes connection structure information comprising a call identifier which is unique to a circuit being established by the datagram and also upstream and downstream links to those circuit nodes which are respectively upstream and downstream of the circuit node currently being visited by the datagram, said currently visited circuit node being arranged to check that the call identifier currently being stored by the datagram is not identical with a call identifier already stored in that circuit node, the data being arranged up update its connection structure information as it traverses successive nodes in the circuit.

18. A distributed communications network as in claim 17, wherein in the event that said currently visited circuit node determines that the call identifier currently being stored by the datagram is identical with a call identifier already stored in that circuit node, the currently visited circuit node is arranged to check the stored connection structure associated with the already-stored call identifier and in the event that the upstream link of the stored connection structure does not lead to the circuit node last visited by the datagram, is arranged to cancel its status as a circuit node and to return the datagram to the last-visited circuit node, said last-visited circuit node being arranged to re-send the returned datagram to an alternative sub-destination node in an attempt to construct a circuit to said destination node.

19. A distributed communications network as in claim 18, wherein each node further includes a third stored list of its links or neighboring nodes, each destination node in said stored list of destination nodes being associated with a link or neighboring node in said third stored list, the criterion on which the entries in said third stored list are based being biased towards near optimum transmission of said data in said temporary circuit, and, when instructed by a datagram to attempt to establish an alternative data circuit, does so by selecting that link or neighboring node entry in said third stored list which corresponds to the desired destination node.

20. A distributed communications network as in claim 19, wherein each node is arranged to record, when acting as a source node, failed attempts to establish a circuit.

21. A distributed communications network as in claim 19, wherein each node is arranged to make further attempts to establish a circuit by sending datagrams via remaining links or neighboring nodes in sequence.

22. A distributed communications network as in claim 1 wherein each node is arranged to monitor the spare data-carrying capacity of each of its links and in the event that it receives a datagram designating it as a circuit node but the downstream link in a circuit being established by the datagram has insufficient date-carrying capacity, is arranged to transmit a datagram to the source node to instruct it to attempt to establish an alternative circuit to the destination node.

23. A distributed communications network as in claim 1 wherein each node is arranged to monitor its links to the neighboring nodes and is arranged, in the event that such a link fails, to update at least one of its said first and said second stored lists accordingly and to communicate to all its remaining neighboring nodes and changes in its said first and said second stored lists which result from link failure.

24. A distributed communications network as in claim 23, wherein each node is arranged to store in its memory means in respect of each of its links, a list of pointers to stored connection structures in which that link is an upstream link in a said data transmission circuit passing through that node, and a list of pointers to stored connection structures in which that link is a downstream link in a said data transmission circuit passing through that node, the node being arranged to detect failure of any of its links, to search the lists of pointers relating to any failed link, and to send datagrams over each remaining link of the connection structures indicated by the pointers relating to the failed link, each connection structure including an upstream link which is directed towards a source node and a downstream link which is directed towards a destination node, each said datagram which is sent via an upstream link being arranged to instruct the associated source node to attempt to establish an alternative circuit and each datagram which is sent via a downstream link being arranged to cancel the downstream portion of the circuit which is interrupted by the link failure.

25. A distributed communications network as in claim 1 wherein each node is arranged to send, on receiving a datagram which designates it a destination node, an acknowledgement datagram back to the corresponding source node.

26. A distributed communications network as in claim 25, wherein each node is arranged to send, when acting as a source node, a further datagram to attempt to establish a circuit in the event that it receives no acknowledgement datagram within a predetermined period after sending the first-mentioned datagram.

27. A distributed communications network as in claim 1 wherein all information carried by said links is in time-division multiplexed form.

* * * * *